United States Patent

Belluche

[15] 3,694,665

[45] Sept. 26, 1972

[54] WIRED OR CIRCUIT

[72] Inventor: Robert A. Belluche, Nashua, N.H.

[73] Assignee: Sanders Associates, Inc., Nashua, N.H.

[22] Filed: Nov. 5, 1970

[21] Appl. No.: 87,031

[52] U.S. Cl. ....................................307/208, 307/218

[51] Int. Cl. ............................................H03k 17/00

[58] Field of Search.......................307/208, 215, 218

[56] References Cited

UNITED STATES PATENTS

| | | | |
|---|---|---|---|
| 3,329,835 | 7/1967 | D'Agostino | 307/218 X |
| 3,417,262 | 12/1968 | Yao | 307/218 |
| 3,302,035 | 1/1967 | Greene | 307/215 X |
| 3,305,785 | 2/1967 | Carroll | 328/56 |

*Primary Examiner*—Herman Karl Saalbach
*Assistant Examiner*—B. P. Davis
*Attorney*—Louis Etlinger

[57] ABSTRACT

WIRED OR circuit arrangement in which a transmission line is used as the OR'ING media. The transmission line is driven from a source of substantially constant current having a source impedance which is substantially equal to the characteristic impedance of the line. Changes in line current are sensed by a current sensing device which also maintains a constant voltage between the line and circuit ground.

6 Claims, 1 Drawing Figure

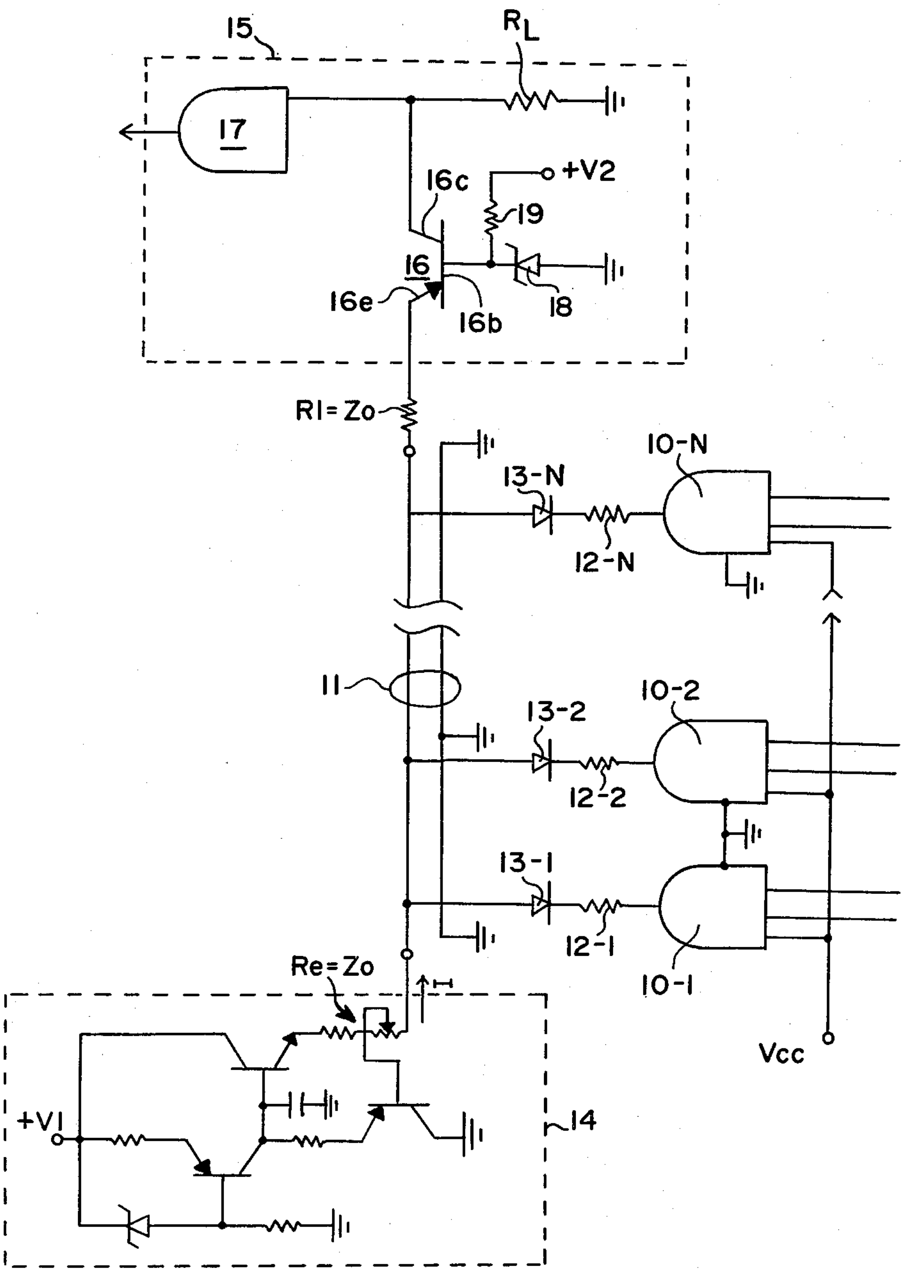
INVENTOR
ROBERT A. BELLUCHE
By *Robert R. Hubbard*
ATTORNEY

WIRED OR CIRCUIT

BACKGROUND OF INVENTION

This invention relates to novel and improved electrical apparatus and in particular to circuitry for connecting the outputs of a relatively large number of gating elements in a WIRED OR configuration. In the usual WIRED OR configuration two or more signal leads are connected together on a single wire to provide a common output signal which is the logical OR of the signals. WIRED OR arrangements are especially attractive to network designers since they avoid the use of gating elements and associated signal propagation delays.

One of the problems associated with WIRED OR arrangements is that the capacitance associated with the ORING point increases as the number of signal leads connected thereto increases. For example, in systems using one type of contemporary gating element, the WIRED OR arrangement requires that the collectors of the output transistors of several gating elements be wired together so as to share a single collector load. The several collector capacities are additive and thus degrade the response time of the OR function. That is, the resistance-capacitance (RC) time constant becomes longer such that the rising and falling edges become more gradual.

BRIEF SUMMARY OF THE INVENTION

An object of the present invention is to provide novel and improved circuitry.

Another object of the present invention is to provide a novel and improved WIRED OR circuit.

Still another object is to provide a novel and improved circuit in which a relatively large number of capacitive signal leads can be wired together without seriously degrading the signal response time.

In brief, the present invention is embodied in apparatus where several capacitive signal leads are wired together by means of a transmission line. One end of the line is driven by a source of substantially constant current having a source impedance equal to the characteristic impedance of the line. The voltage between the other end of the line and the ground is held constant and the line current is monitored by a current sensing device. Whenever any one or more of the signal leads connected along the line provides a low impedance path to ground, some of the current is diverted so that the current sensor detects a dip in current. Preferably, an output buffer element is also provided to convert the dip in current value to a usable signal.

BRIEF DESCRIPTION OF THE DRAWING

For a clearer understanding of the invention, reference may be had to the following detailed description and the accompanying drawing, the sole FIGURE of which is a schematic diagram of a preferred embodiment.

DESCRIPTION OF PREFERRED EMBODIMENT

Referring to the sole FIGURE of the drawing, a plurality of gating elements 10–1 and 10–2 to 10–N are shown to have their respective output leads coupled to various points along the length of the transmission line 11 in a WIRED OR configuration. The output signal leads of gating elements 10–1 to 10–N each have a stray capacitance to ground such as might be associated with the output electrode of an active electronic device as for example a bipolar transistor, a field effect transistor and other devices.

By way of example, the gating elements 10–1 through 10–N are assumed to be of the transistor-transistor-logic (TTL) type in which the output device is a bipolar transistor connected in the common emitter configuration so as to operate between cut-off and saturation. When the transistor is saturated, its collector-emitter path provides a low impedance path to the circuit reference potential which is illustrated on the drawing as circuit ground. On the other hand, when the transistor is cut off the capacitance between its collector and ground becomes charged by way of a collector load or pull up device to approximately the value of the collector supply voltage $V_{cc}$. Thus, each of the gating elements is shown to have connections to circuit ground and to the supply voltage $V_{cc}$. For simplicity, only two input leads have been shown for the gating elements, though more may be employed.

The gating elements 10–1 to 10–N may be physically located anywhere in the apparatus. For example, they may be located on the same or different printed circuit boards in an apparatus rack. The transmission line 11 would then be routed from location to location. For instance, in many practical situations the transmission line 11 would have a length on the order of 2 to 5 feet, though the invention is also applicable for transmission line lengths which are shorter or longer.

The connections of the gating element output leads to the transmission line are by way of series connected resistors and diodes. To this end, the output of gating element 10–1 is coupled by way of a resistor 12–1 and a diode 13–1 to the line 11. Similarly, the series connected resistor 12–2 and diode 13–2 and resistor 12–N and diode 13–N couple the outputs of the gating elements 10–2 and 10–N to the transmission line, respectively.

One end of the transmission line 11 is driven by a source 14 of substantially constant current. The source 14 may take on any suitable circuit form, such as the one illustrated. Since the details of the source 14 are not germane to an understanding of the invention, no detailed description is necessary. Suffice it to say here that the source 14 does have a source impedance designated as $R_e$ which is equal to the characteristic impedance $Z_0$ of the transmission line. In addition, a terminating resistor $R1=Z_0$ is connected to the other end of line 11. Thus, both ends of line 11 are terminated in its characteristic impedance so as to prevent ringing on the line.

The voltage +V1 for the current source 14 and the collector supply $V_{cc}$ as well as the hereinafter referred to voltage +V2 may be derived from any suitable power supply, not shown.

The current on transmission line 11 is monitored at the end remote from the current source by means of a current sensing device 15 which may suitably include a common base transistor 16 and a buffer element 17. The transistor 16 has its emitter **16*e* connected to the transmission line 11 and its collector 16*c* connected both to a collector load $R_1$ and to the input of buffer element 17. The base electrode 16*b* is held to a relatively constant voltage by means of a Zener diode 18 and a resistor 19** which is connected to the voltage +V2.

In operation, the current source 14 provides a substantially constant current I to the line 11. When all of the gates 10–1 to 10–N are turned off (output transistors turned off), all of the current I is monitored by the current sensor 15. The voltage on line 11 is at a value higher than that at emitter **16*e* by an amount equal to the voltage drop across R1 (IR1). When one of the gating elements 10–1 to 10–N is turned on, some of the current I is diverted so that the value of current monitored by the current sensor 15 dips or decreases. The dip in current value is sensed by transistor 16 so as to produce a corresponding decrease in collector current. The decrease in collector current of transistor 16 is converted by the buffer element 17** to a useable signal level at its output.

The voltage between ground and the point of line 11 to which a turned on gate is coupled is primarily a function of the voltage drops across the associated one of the resistors 12–1 to 12–N and the associated one of the diodes 13–1 to 13–N. This voltage is substantially equal to or slightly higher than the voltage between emitter **16*e* and ground. The purpose of the resistors 12–1 to 12–N is to assure that a specific amount of current is switched from line 11 when the associated gates are turned on and that a finite impedance greater than $Z_0$ exists between line 11 and ground. The purpose of the diodes 13–1 to 13–N is to assure that a high impedance isolation exists between the outputs of turned off gates and line 11 and between the outputs of the turned off gates and the outputs of the turned on gates. This isolation is achieved because the diodes are backed biased by the line 11 voltage being less than the voltage at the output of a turned off gate. The output capacities of the gates 10–1 to 10–N are also effectively isolated from the transmission line 11. Accordingly, when a turned on gate is turned off, the recovery time is relatively rapid through the low impedance $Z_{0/2}$ of line 11 and the small values of stray wiring capacitance associated with the connections to line 11**.

The operation described thus far is for a preferred EXCLUSIVE OR embodiment. For the more general ORING situation where one or more gates are turned on simultaneously, the transistor 16 may turn off depending upon the value of constant current I supplied by source 14 and/or values of resistors 12–1 to 12–N. In any event, for those designs where transistor 16 does turn off in response to two or more gates turning on simultaneously, and the voltage at **16*e* falls below its normal level the output of buffer 17 still changes to indicate that one or more of the gates has been turned on. However, the recovery time will be somewhat longer as more time will be needed to bring the line 11 voltage up to a value where transistor 16** can begin to conduct. Whether this recovery time is tolerable will, of course, depend upon the application.

There has been described a WIRED OR circuit embodying the invention. It should be appreciated that current sources and current sensors other than those illustrated may be employed in designs embodying the invention. In addition, the transmission line 11 may assume any suitable form, such as coaxial cable, twisted pair, twin pair, stripline and others. However, to achieve high operating speeds and a large input capability the characteristic impedance $Z_0$ should be made as small as possible.

What is claimed is:

1. A wired OR circuit comprising
a plurality of gating elements each including an output signal lead having first and second voltage conditions when the corresponding gating element is turned on and off, respectively;
a transmission line;
a current source for applying a substantially constant current to one end of said line;
means for coupling said gating element output signal leads to different points along said line such that when any one of said gating elements is turned on a portion of the constant current is diverted from the line thereby resulting in a dip in current value at the other end of the line; and
current sensing means coupled to the other end of said line and responsive to said dips in current value to provide an output signal having a first value when at least one of said gating elements is turned on and a second value when all of said gating elements are turned off.

2. The invention according to claim 1
wherein said line is terminated at each end in its characteristic impedance.

3. The invention according to claim 2
wherein said current sensing means includes means for maintaining a constant voltage between said other end of the line and a circuit reference potential.

4. The invention according to claim 3
wherein said current sensing means includes a transistor connected in the common base configuration with its emitter coupled to said line, and its collector coupled to an output buffer which produces said output signal;
wherein said constant voltage means includes a Zener diode network coupled to the base of said transistor.

5. The invention as set forth in claim 3
wherein said coupling means includes a like plurality of series circuits, different ones of which couple the signal leads of different ones of the gating elements to said different points; and
wherein each of said series circuits includes a diode and a resistor.

6. The invention as set forth in claim 5
wherein each of said diodes is poled so as to be reverse biased when its associated gating element is turned off.

* * * * *